United States Patent
Nakahara et al.

(10) Patent No.: US 8,014,253 B2
(45) Date of Patent: *Sep. 6, 2011

(54) OPTICAL DISC AND OPTICAL DISC DEVICE

(75) Inventors: Hironori Nakahara, Tokyo (JP); Nobuo Takeshita, Tokyo (JP); Masaharu Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1034 days.

This patent is subject to a terminal disclaimer.

(21) Appl. No.: 11/878,462

(22) Filed: Jul. 24, 2007

(65) Prior Publication Data
US 2007/0263498 A1 Nov. 15, 2007

Related U.S. Application Data

(62) Division of application No. 11/579,832, filed as application No. PCT/JP2005/015160 on Aug. 19, 2005.

(30) Foreign Application Priority Data

Feb. 16, 2005 (JP) .................................. 2005-039026
Feb. 18, 2005 (JP) .................................. 2005-043131

(51) Int. Cl.
G11B 7/20 (2006.01)
(52) U.S. Cl. ........................................... 369/94
(58) Field of Classification Search .................. None
See application file for complete search history.

(56) References Cited

U.S. PATENT DOCUMENTS

| | | | |
|---|---|---|---|
| 5,732,065 A | 3/1998 | Braat et al. | |
| 5,737,287 A | 4/1998 | Lee | |
| 7,286,153 B1 * | 10/2007 | Sugiyama et al. | 347/224 |
| 7,830,767 B2 * | 11/2010 | Suh | 369/59.25 |
| 2005/0036438 A1 * | 2/2005 | Heemskerk et al. | 369/275.4 |
| 2005/0088945 A1 * | 4/2005 | Nishiuchi et al. | 369/94 |
| 2007/0263499 A1 * | 11/2007 | Nakahara et al. | 369/44.27 |
| 2008/0068969 A1 * | 3/2008 | Nakahara et al. | 369/94 |
| 2008/0123497 A1 * | 5/2008 | Nakahara et al. | 369/53.23 |
| 2008/0130464 A1 * | 6/2008 | Nakahara et al. | 369/112.01 |

FOREIGN PATENT DOCUMENTS

| | | |
|---|---|---|
| CN | 1165575 A | 11/1997 |
| EP | 0 833 311 A2 | 4/1998 |
| EP | 1 065 665 A1 | 1/2001 |
| EP | 1 111 604 A1 | 6/2001 |
| EP | 1 492 098 A2 | 12/2004 |

(Continued)

*Primary Examiner* — Joseph Feild
*Assistant Examiner* — Henok Heyi
(74) *Attorney, Agent, or Firm* — Birch, Stewart, Kolasch & Birch, LLP.

(57) ABSTRACT

In a multilayer optical disc having information layers conforming to a plurality of different optical disc standards, because the type of each information layer is not recorded in the other information layers, in read and write operations by a compatible optical disc device conforming to a plurality of optical disc standards, every time the information layer being accessed changes, it has been necessary to read the type of the information layer and select a method of generating a tracking error signal adapted to the type of information layer, so access has taken time. In order to solve the above problem, in the optical multilayer disc according to the present invention, having information layers conforming to a plurality of different optical disc standards, in an area in one of the information layers, information about the other information layers is recorded. The time required to access the other information layers can be reduced by using this information to select a tracking error signal generating method.

2 Claims, 7 Drawing Sheets

FOREIGN PATENT DOCUMENTS

| | | |
|---|---|---|
| GB | 2 439 224 A | 12/2007 |
| JP | 9-274765 A | 10/1997 |
| JP | 11-66576 A | 3/1999 |
| JP | 11-232700 A | 8/1999 |
| JP | 11-238362 A | 8/1999 |
| JP | 2003-308631 A | 10/2003 |
| JP | 2004-95005 A | 3/2004 |
| JP | 2004-199757 A | 7/2004 |
| JP | 2004-206849 A | 7/2004 |
| JP | 2005-38584 A | 2/2005 |
| JP | 2006-172574 A | 6/2006 |
| KR | 10-2004-0079944 A | 9/2004 |
| WO | WO-97/09716 A1 | 3/1997 |
| WO | 01/01408 A1 | 1/2001 |
| WO | WO-03/063144 A2 | 7/2003 |

* cited by examiner

OPTICAL DISC AND OPTICAL DISC DEVICE

CROSS REFERENCE TO RELATED APPLICATIONS

This application is a Divisional of co-pending application Ser. No. 11/579,832, filed on Nov. 7, 2006, for which priority is claimed under 35 U.S.C. §120. Application Ser. No. 11/579,832 is the national phase of PCT International Application No. PCT/JP2005/015160 filed on Aug. 19, 2005 under 35 U.S.C. §371. The entire contents of each of the above-identified applications are hereby incorporated by reference.

FIELD OF THE INVENTION

The present invention relates to a multilayer optical disc having information layers conforming to a plurality of different optical disc standards and an optical disc device for recording or reproducing information on the optical disc.

BACKGROUND ART

Optical discs are a subject of research in the information recording field. They have a wide range of applications, from industrial use to consumer use, because they enable non-contact recording and reproduction, because they can accommodate large files at low cost, and because reproduction-only, writable, or rewritable media can be selected according to the application.

The capacity of optical discs has been increased by reducing the size of the information stored on the tracks, by using laser beams having shorter wavelengths as light sources for recording and reproducing, by using objective lenses with higher numerical apertures, and by reducing the size of the focused light spot on the focal plane.

For example, in a CD (compact disc), the thickness of the disc substrate used as a light transmitting layer is about 1.2 mm, the wavelength of the laser beam is about 780 nm, the numerical aperture (NA) of the objective lens is 0.45, and the disc capacity is 650 MB. In a DVD (digital versatile disc), the thickness of the disc substrate used as a light transmitting layer is about 0.6 mm, the wavelength of the laser beam is about 650 nm, the numerical aperture of the object lens is 0.6, and the disc capacity is 4.7 GB. For a DVD, two disc substrates having thicknesses of about 0.6 mm each are laminated together, to obtain a disc having a thickness of about 1.2 mm.

A BD (Blu-ray disc) disc having a still higher density uses an optical disc having a protection layer as thin as 0.1 mm as the light transmitting layer on the optical recording layer. With a laser beam wavelength of about 405 nm and a numerical aperture of 0.85, capacities in excess of 23 GB are obtained.

Thus, as optical disc capacities have increased, various optical disc standards have been established, including CD, DVD, and BD. Optical disc recording and reproducing devices are generally compatible with a plurality of different optical disc standards.

For example, some DVD recording and reproducing devices can record and reproduce information not only on a DVD but also on a CD. Some BD recording and reproducing devices can record and reproduce information on BDs, DVDs, and CDs. These compatible recording and reproducing devices are extremely convenient because they allow the user to record and reproduce information on optical discs in the user's possession that conform to old standards, and they have played an important role in smoothing the introduction of new standards.

Although discs have been manufactured according to each of the different standards, to increase the user's convenience, a multilayer optical disc having information layers conforming to a plurality of different optical disc standards has been developed (for example, patent document 1).

Patent document 1: Japanese Unexamined Patent Application Publication No. 2004-95005

DISCLOSURE OF THE INVENTION

Problems to be Solved by the Invention

A problem with such optical discs as the above is that when one information layer is being accessed, it is not known whether another information layer is present or not, so if the need to reproduce or record information on another information layer suddenly arises, it takes time to access the other designated information layer.

Another problem with optical discs such as the above is that the type of one information layer is not recorded on another layer, so when an optical disc device conforming to a plurality of different optical disc standards reads or writes information, every time the device accesses a different information layer, it must read the type of the layer to select a method of generating a tracking error signal adapted to the type; consequently, access takes time.

The purpose of the present invention is to shorten the access time in a multilayer optical disc having information layers conforming to a plurality of different optical disc standards.

Means of Solution of the Problems

In a multilayer optical disc having information layers conforming to a plurality of different optical disc standards, the present invention is an optical disc in which an information layer of highest recording density has a management area in which information indicating the types of other information layers is recorded, the types including at least a reproduction-only type.

In a multilayer optical disc having information layers conforming to a plurality of different optical disc standards, the present invention is also an optical disc in which an information layer of highest recording density has a management area in which information indicating presence or absence of other information layers is recorded.

Effect of the Invention

In a multilayer optical disc having information layers conforming to a plurality of different optical disc standards, the present invention enables the access time to be shortened.

Figure 1:
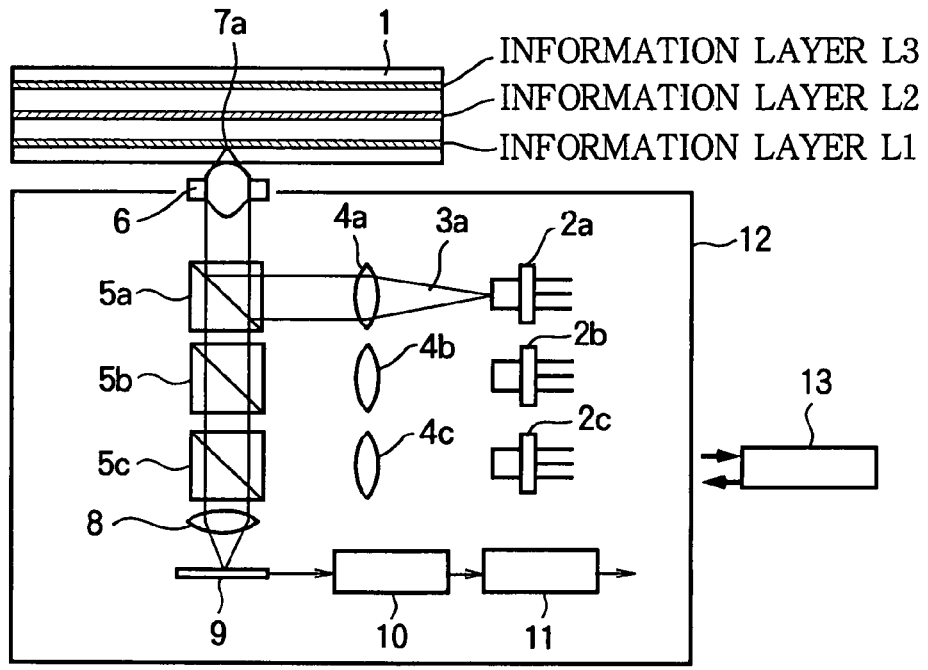
FIG. 1 is a schematic drawing of an optical disc and optical disc device in a first embodiment, showing the optical disc device accessing information layer L1 of the optical disc.

EXPLANATION OF REFERENCE CHARACTERS 1 optical disc, 2a blue-violet semiconductor laser light source, 2b red semiconductor laser light source, 2c infrared semiconductor laser light source, 3a beam from blue-violet semiconductor laser light source, 3b beam from red semiconductor laser light source, 3c beam from infrared semiconductor laser light source, 4a, 4b, 4c collimating lens, 5a, 5b, 5c prism, 6 objective lens, 7a focused spot from blue-violet semiconductor laser light source, 7b focused spot from red semiconductor laser light source, 7c focused spot from infrared semiconductor laser light source, 8 sensor lens, 9 photodetector, 10 signal processing means, 11 image processing means, 12 optical disc device, 13 host device, 14, 14a management area, 15, 15a user data area, 16, information field, 17 land, 18 groove, 19 recording mark, 20 pit, 21 indicator area, 22 type area

BEST MODE OF PRACTICING THE INVENTION

First Embodiment

Figure 2:
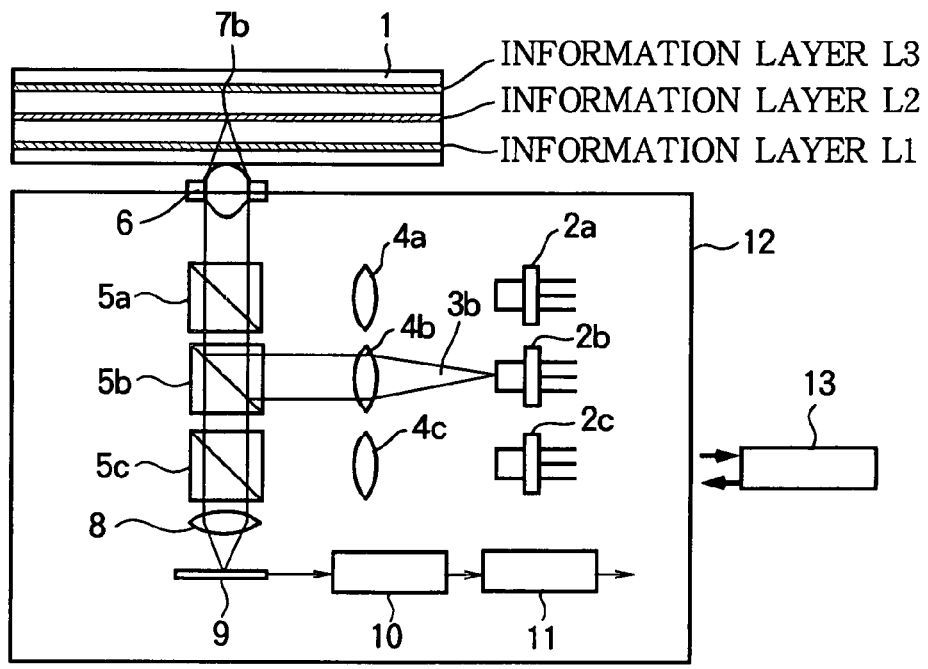
FIG. 2 is a schematic drawing of the optical disc and optical disc device in the first embodiment, showing the optical disc device accessing information layer L2 of the optical disc.
Figure 3:
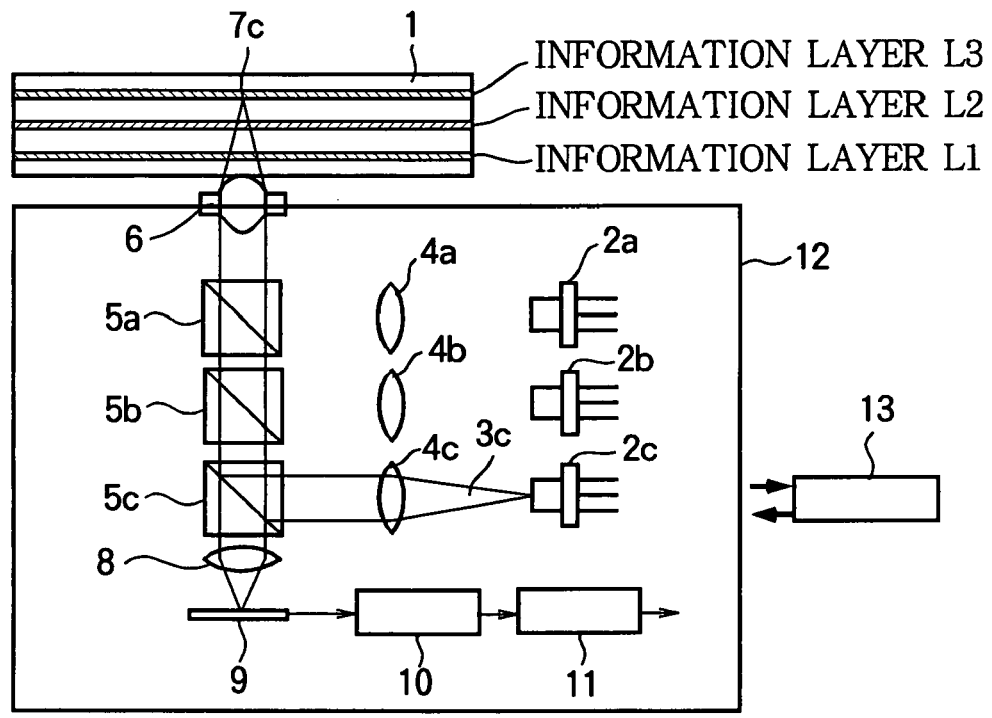
FIG. 3 is a schematic drawing of the optical disc and optical disc device in the first embodiment, showing the optical disc device accessing information layer L3 of the optical disc.
Figure 4:
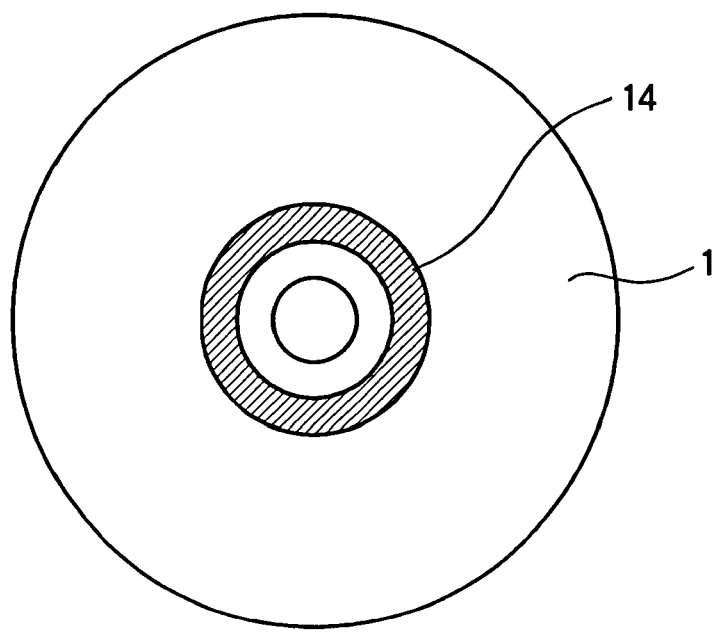
FIG. 4 is a schematic drawing showing the management area in information layer L1 of the optical disc in the first embodiment.
Figure 5:
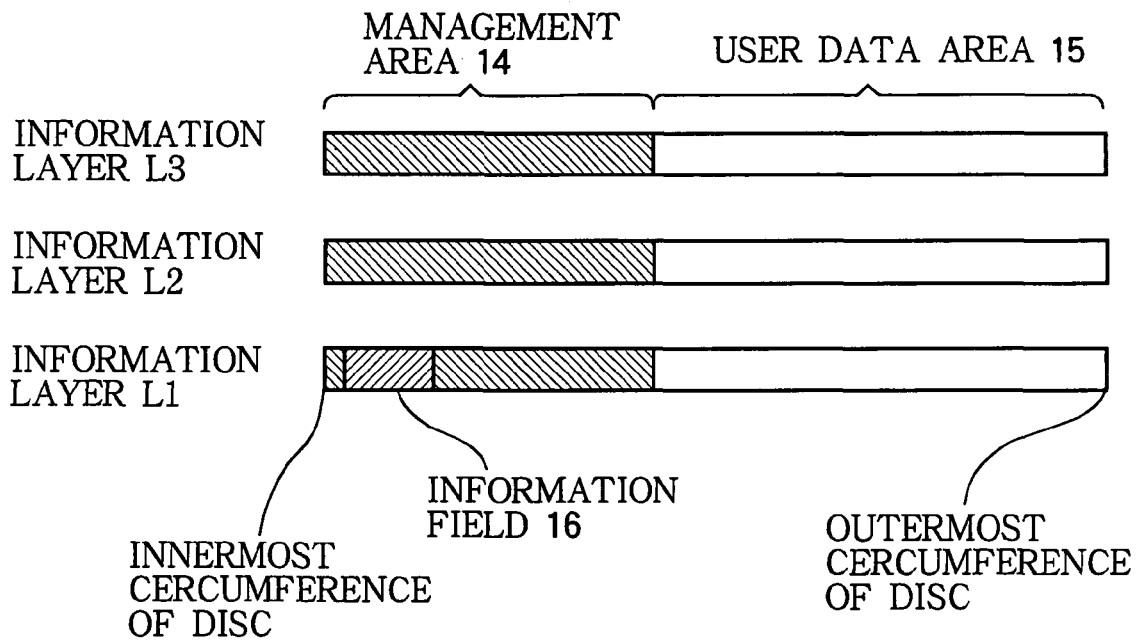
FIG. 5 is a schematic drawing of the data structure of the optical disc in the first embodiment, showing an information field in the management area.
Figure 6:
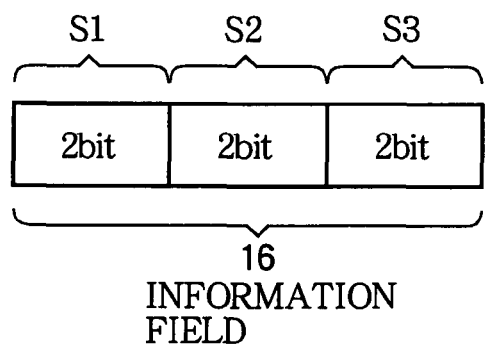
FIG. 6 is a conceptual drawing of the information field in the management area in the first embodiment.
Figure 7:
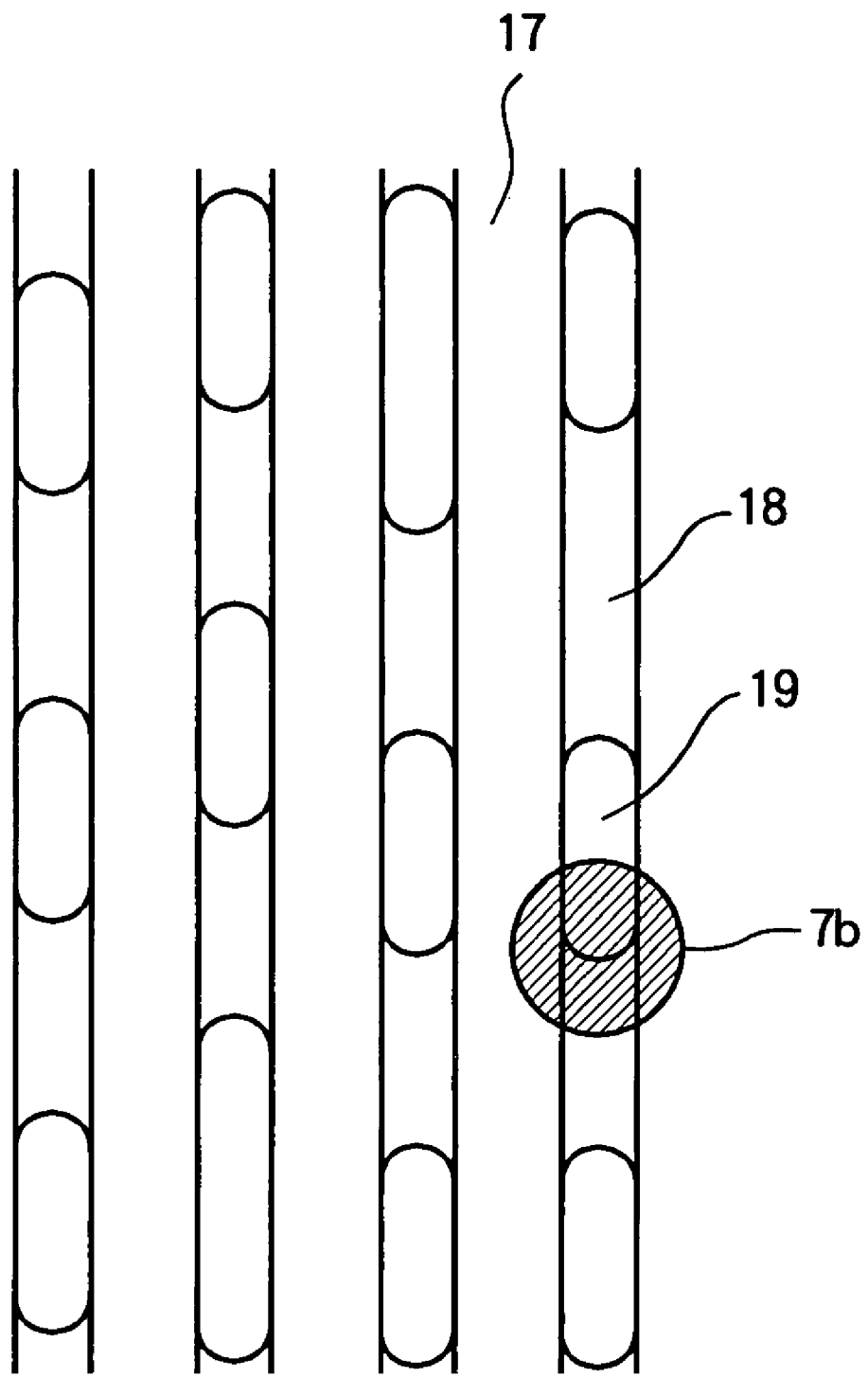
FIG. 7 is a schematic drawing showing a focused spot and information written in tracks on information layer L2 in the first embodiment.
Figure 8:
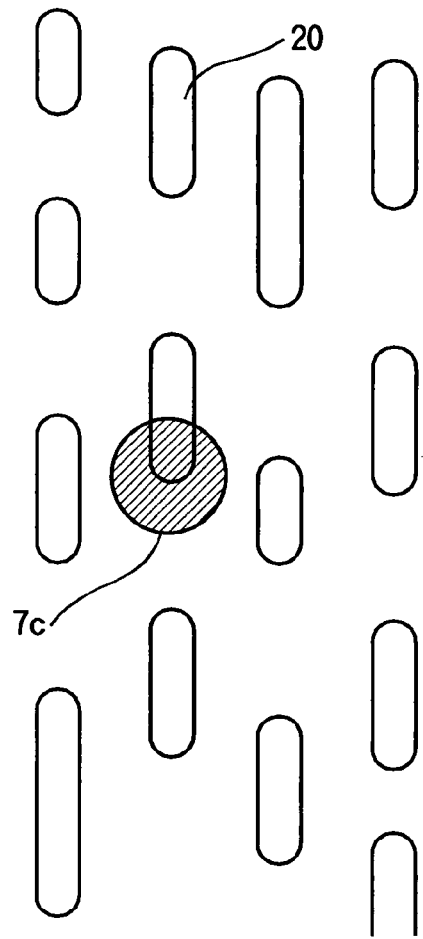
FIG. 8 is a schematic drawing showing a focused spot and information written in tracks on information layer L3 in the first embodiment.
Figure 9:
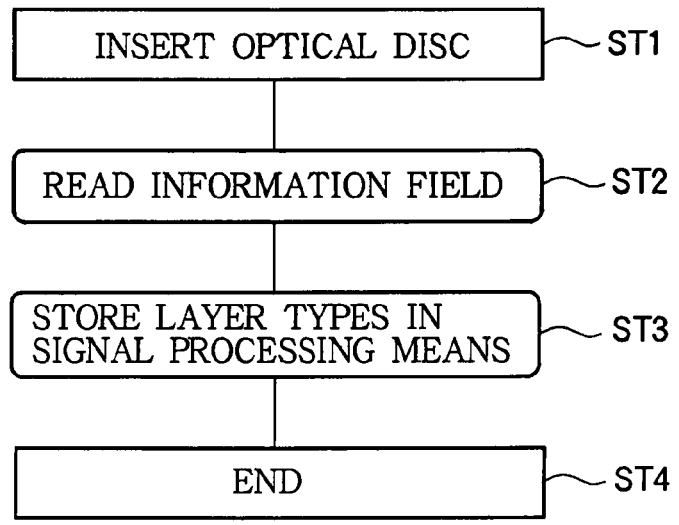
FIG. 9 is a flowchart illustrating a sequence that reads information about the individual types of information layers in the first embodiment.
Figure 10:
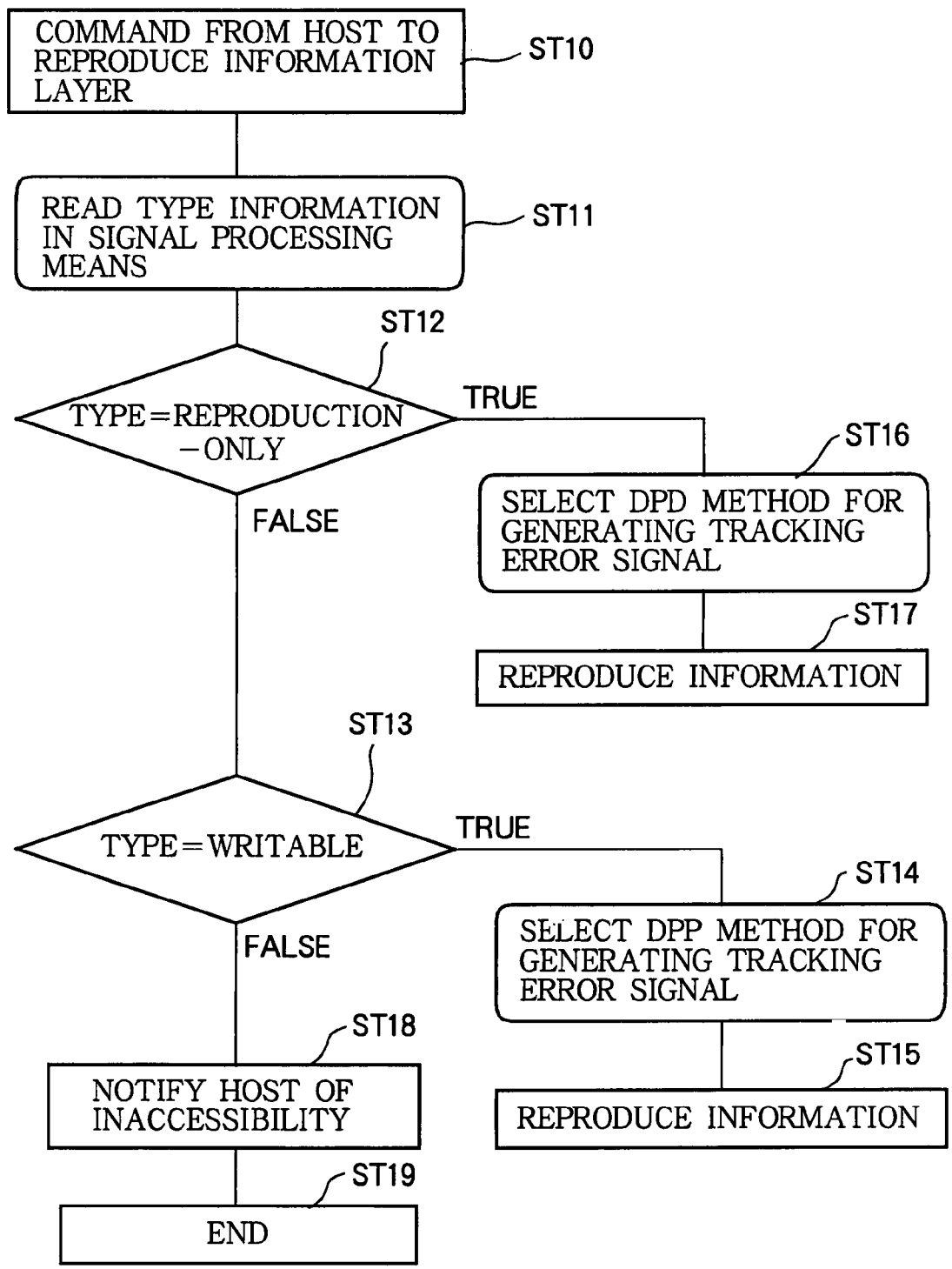
FIG. 10 is a flowchart illustrating a sequence that uses the information about the individual types of information layers in the first embodiment to reproduce information from another information layer.

FIGS. 1 to 3 are schematic drawings showing an optical disc and an optical disc device accessing an information layer in the optical disc in the first embodiment of the invention; FIG. 4 is a schematic drawing showing the management area in information layer L1 of the optical disc in FIG. 1. FIG. 5 is a schematic drawing showing the data structure of the optical disc, including the information field in the management area. FIG. 6 is a conceptual drawing of the information field in the management area. FIG. 7 is a schematic drawing showing a focused spot and information written in tracks on information layer L2; FIG. 8 is a schematic drawing showing the focused spot and information written in tracks on information layer L3. FIG. 9 is a flowchart illustrating a sequence that reads information about the individual types of information layers. FIG. 10 is a flowchart illustrating a sequence that uses the information about the individual types of information layers to reproduce information from another information layer.

The first embodiment of the invention will now be described with reference to the attached drawings. The optical disc 1 in the first embodiment is provided with information layers L1, L2, and L3 for a plurality of differing optical disc standards. Information layers L1, L2, and L3 are disposed at distances of 0.1 mm, 0.6 mm, and 1.2 mm from the surface, in this order. These information layers L1, L2, and L3 satisfy the BD, DVD, and CD optical disc standards, in this order, information layer L1 being the layer with the highest recording density, information layer L3 being the layer with the lowest recording density. In the following description, these layers are a reproduction-only layer, a writable layer, and a reproduction-only layer, respectively.

In the state in FIG. 1, information layer L1 is being accessed; a beam 3a emitted from a blue-violet semiconductor laser light source 2a, which has a wavelength of about 405 nm, this being the shortest wavelength, is collimated by a collimator lens 4a, reflected by a prism 5a, and focused to a focused spot 7a on information layer L1 by an objective lens 6.

The beam 3a reflected from information layer L1 returns to the objective lens 6, then passes through prisms 5a, 5b, 5c and is directed by a sensor lens 8 onto a photodetector 9.

The photodetector 9 converts the received light beam into electrical signals for output to a signal processing means 10. The signal processing means 10 controls the amount of light emitted by light source 2a, generates a tracking error signal indicating the relative positional discrepancy between the focused spot and the tracks on the information layer, and after signal processing, outputs information to an image processing means 11. The image processing means 11 performs image processing and output.

The above elements from the laser light source 2a to the image processing means 11 constitute an optical disc device 12. The optical disc device 12 records and reproduces information on the optical disc 1 according to commands from a host device 13. The host device 13 is a PC (personal computer) that instructs the optical disc device 12 to record and reproduce information. Alternatively, the host device 13 may be an audiovisual reproduction device that decodes information read out from the optical disc device 12 and outputs images and/or sounds, and/or an audiovisual recording device that encodes image and/or sound information input from an external device and instructs the optical disc device 12 to record the information.

In the state in FIG. 2, information layer L2 is being accessed. A beam 3b having a wavelength of about 650 nm is emitted from a red semiconductor laser light source 2b, collimated by a collimator lens 4a, reflected by prism 5b, and focused to a focused spot 7b on information layer L2 by the objective lens 6.

The beam 3b now passes through information layer L1. The material and structure of information layer L1 are selected so as to avoid interference with access to information layer L2, taking physical properties such as transmittance and reflectance of a light beam having a wavelength of about 650 nm into consideration.

The beam 3b reflected from information layer L2 returns to the objective lens 6, then passes through prisms 5a, 5b, 5c and is directed by the sensor lens 8 onto the photodetector 9. The signal processing means 10 and image processing means 11 operate as above; descriptions will be omitted. In FIG. 2, the signal processing means 10 controls light source 2b.

In the state in FIG. 3, information layer L3 is being accessed. A beam 3c emitted from an infrared semiconductor laser light source 2c having a wavelength of about 780 nm is collimated by a collimator lens 4c, reflected by a prism 5c, and focused to a focused spot 7c on information layer L3 by the objective lens 6.

The beam 3c now passes through information layers L1 and L2. The materials and structure of information layers L1 and L2 are selected so as to avoid interference with access to information layer L3, taking physical properties such as transmittance and reflectance of a light beam having a wavelength of about 780 nm into consideration.

The beam 3b reflected from information layer L2 returns to the objective lens 6, then passes through prisms 5a, 5b, 5c and is directed by the sensor lens 8 onto the photodetector 9. The signal processing means 10 and image processing means 11 operate as above; descriptions will be omitted. In FIG. 3, the signal processing means 10 controls light source 2c.

The management area 14 disposed in information layer L1 in FIG. 4 and FIG. 5 is located at the innermost circumference of the optical disc 1, the rest of the area being a user data area 15. The information field 16 in this management area 14 contains information indicating the type of each information layer. The optical disc device 12 obtains information indicating the types of information layers by reading the information from the information field 16.

FIG. 6 is a conceptual drawing of the information field 16. Areas S1, S2, S3 in the information field 16 are bit areas indicating the types of information layers L1, L2, L3, respectively. Each of areas S1, S2, S3 comprises two bits, making six bits in total. When an information layer is of the reproduction-only type, the bit values are '01', and when a layer is of the writable type, the bit values are '10'. Absence of an information layer is represented by bit values of '00'. Therefore, in the first embodiment, areas S1, S2, S3 have values '01', '10', '01', respectively.

FIG. 7 shows focused spot 7b and information written on a track of a writable information layer. A writable information layer has tracks referred to as lands 17 and grooves 18. Information is recorded as recording marks 19 by inducing a chemical change or shape change in the material. In a writable information layer, a tracking error signal is generated by the Differential Push-Pull method (DPP method), which is known in the art. In this method, the light is split into three beams and focused on the information layer, the reflected light is received by three binary photodetectors, and calculations are carried out to generate a tracking error signal.

FIG. 8 shows focused spot 7c and information written on a track of a reproduction-only information layer. On a reproduction-only layer, information is recorded in the form of microscopic holes called pits 20. The tracking error signal is generated by the Differential Phase Detection method (DPD method), which is also known in the art. In this method, the light beam is focused on an information layer, the reflected light of the focused light is received by one four-quadrant photodetector, and calculations are carried out to generate the tracking error signal.

In FIG. 9, when the optical disc 1 is inserted into the optical disc device 12 (ST1), the optical disc device 12 reads information from the information field 16 in the management area 14 on information layer L1 of the optical disc 1 to obtain information indicating the types of information layers L1, L2, L3. The information is retained in the signal processing means 10 (ST3) and the process ends (ST4). The device returns to a standby mode to wait for a command from the host device 13.

In FIG. 10, in response to a command from the host device 13 to reproduce information on information layer L2 (ST10), the optical disc device 12 follows the sequence by reading the type of information layer L2 retained in the signal processing means 10 as above (ST11). As information layer L2 is not a reproduction-only layer (FALSE in ST12) but a writable layer (TRUE in ST13), the DPP method is selected, which is suitable for writable information layer L2, the laser power of the laser having a wavelength suitable for information layer L2 is set at the same time, a tracking error signal is generated (ST14), and information is reproduced from information layer L2 (ST15).

Similarly, in response to a command from the host device 13 to reproduce information from information layer L3 (ST10), the optical disc device 12 follows the sequence by reading the type of information layer L3 retained in the signal processing means 10 as above (ST11). As information layer L3 is a reproduction-only layer (TRUE in ST12), the DPD method is selected, which is suitable for reproduction-only information layer L3, the laser power of the laser having a wavelength suitable for information layer L3 is set at the same time, a tracking error signal is generated (ST16), and information is reproduced from information layer L3 (ST17).

When the optical disc device 12 receives the information reproducing command from the host device 13, if the type of information layer L3 retained in the signal processing means 10 is neither the reproduction-only type nor the writable type (FALSE in ST12 and ST13), that is, if the type information is not recognizable by the optical disc device, a notification is returned to the host device 13 indicating that the information layer to be reproduced is not accessible (ST18), and the process ends (ST19). The optical disc device 12 returns to a standby mode to wait for the next command from the host device 13.

In FIG. 10, steps ST12 and ST13 can be performed in either order to determine the type of the information layer, that is, to determine where the layer is of the reproduction-only type or writable type.

FIG. 10 shows a case in which the host device 13 commands the reproduction of the information. When the host device 13 commands the recording of the information, access time can be similarly shortened and appropriate recording operations can be carried out on the information layer to be recorded, based on the information indicating the type of information layer.

In this embodiment, in a multilayer optical disc having information layers conforming to a plurality of different optical disc standards, information indicating the type of other information layers is recorded, so the optical disc device can easily identify the types of the other information layers, and access time to those layers can be shortened.

Furthermore, the information indicating the types of the other information layers is recorded in the management area of the information layer having the highest recording density. It can be anticipated that the information layer having the highest recording density will be accessed most frequently, so the optical disc device will be sure to read and retain the information.

When recording and reproducing information on an optical disc as above, before access, the optical disc device can set a suitable value for the laser power of the laser having a wavelength suitable for the layer to be accessed, based on the information indicating the type of the information layer. Also, the method of generating a tracking error indicating a relative positional discrepancy between the focused spot and the information written in tracks in a direction crossing the plurality of tracks can be determined in advance, so access time can be shortened.

Second Embodiment

The second embodiment is similar to the first embodiment in regard to FIG. 1 to FIG. 5 and FIG. 7 to FIG. 10, but differs from the first embodiment in regard to the usage of the part of the management area in FIG. 6.

Figure 11:
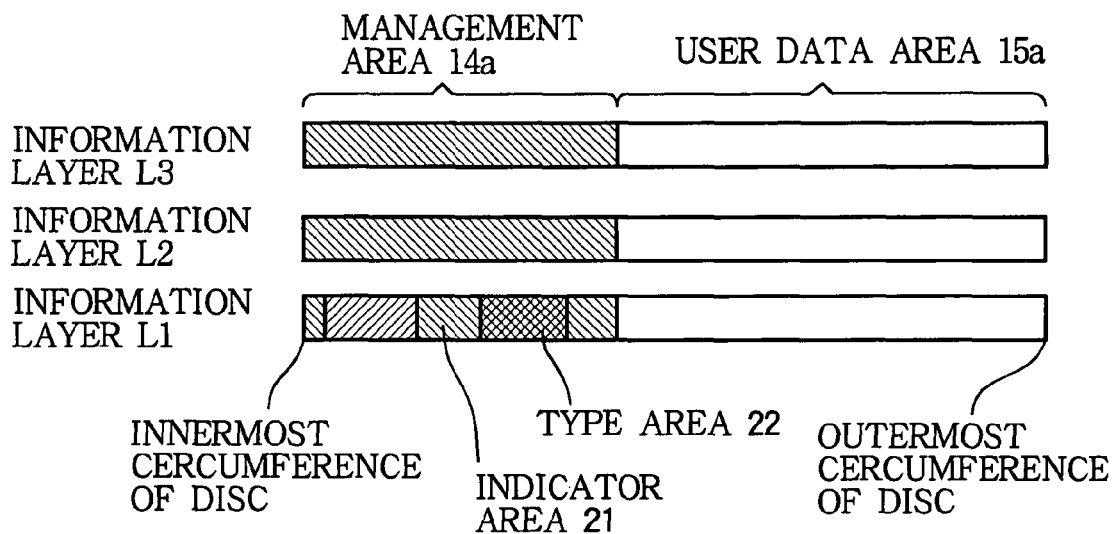
FIG. 11 is a schematic diagram showing the management area in information layer L2 in a second embodiment.
Figure 12:
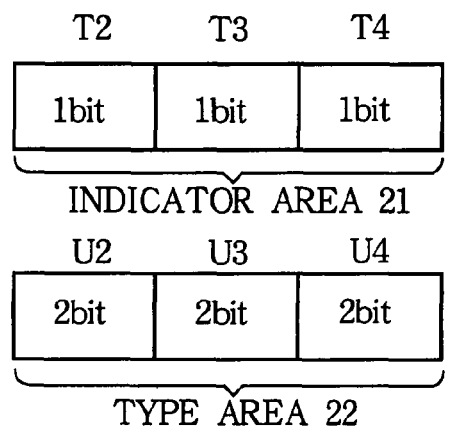
FIG. 12 is a conceptual drawing of parts of the management area in the second embodiment.

Referring to FIG. 11, the optical disc comprises a management area 14a located at its inner circumference and a user data area 15a extending toward its outer circumference. Inside the management area 14a, an indicator area 21 is provided to record information indicating the presence or absence of other information layers, and a type area 22 is provided to record information indicating the types of the other information layers. In FIG. 12, areas T2 and T3 of indicator area 21 respectively record information indicating the presence or absence of information layers L2 and L3 shown in FIG. 1. Area T4 indicates the presence or absence of another information layer (not shown in optical disc 1) conforming to an optical disc standard other than the BD standard which uses a blue-violet semiconductor laser having about a 405-nm wavelength as a light source, or to a standard that may be developed in the future. Areas T2, T3, T4 store one bit of information each, so the indicator area 21 stores three bits in total. A bit value of '1' indicates the presence of another information layer, while a bit value of '0' indicates the absence of the other information layer.

In FIG. 12, areas U2, U3, U4 in the type area 22 are associated with the information represented by areas T2, T3, T4 of indicator area 21, respectively; areas U2, U3, U4 record information indicating the type of the corresponding information layers. That is, when areas T2, T3, T4 indicate the presence of an information layer (bit value '1'), areas U2, U3, U4 indicate the type of the information layer. Areas U2, U3, U4 contain two bits of information each, so type area 22 has six bits in total. When a layer is of the reproduction-only type, the corresponding bit values are '00'. When the layer is of the writable type, the bit values are '01', and when it is of the rewritable type, the bit values are '10'. The writable type includes the DVD−R and DVD+R standards and their dual-layer standards, which permit writing but not rewriting. The rewritable type includes the dual-layer DVD−RW and DVD+RW standards and DVD−RAM. When one of areas T2, T3, T4 indicates the absence of a corresponding information layer (bit value '0'), the value '00', indicating a 'reserved area', is assigned to the corresponding U2, U3, or U4 area. Although, this value is apparently the same as for an information layer of the reproduction-only type, no particular problem occurs, because when one of the T2, T3 and T4 bits is '0', the optical disc device will not read the corresponding U2, U3, or U4 area. Alternatively, a bit value (for example '11') other than the above can be assigned.

When an optical disc is inserted into the optical disc device, the device reads the information in areas T2, T3, T4 of the indicator area 21 in the management area 14a on information layer L1 of the optical disc to obtain information indicating the presence or absence of information layers L2 and L3 and information layers conforming to other standards. When one of areas T2, T3, T4 indicates the presence of a corresponding information layer (bit value '1'), the optical disc device reads the corresponding one of areas U2, U3, U4 in the type area 22 in the management area 14a, obtains information indicating the type of information layer, and retains the obtained information in the signal processing means 10. Subsequent operations are similar to those shown in the flowchart in FIG. 10.

The optical disc device can be configured to read only those of the areas U2, U3, U4 in the type area 22 corresponding to areas T2, T3, T4 indicating the presence of an information layer (bit value '1'). Alternatively, the optical disc device can be configured to read information in all areas U2, U3, U4 of the type area 22 regardless of whether the corresponding information layer is present or not.

When an information layer corresponding to area T4 is present, and the information layer conforms to an optical disc standard, other than the BD standard, that uses a blue-violet semiconductor laser having a wavelength of about 405 nm as a light source, the disc will have a plurality of information layers (two layers, information layer L1 and the information layer corresponding to area T4) using the shortest wavelength of approximately 405 nm; in this case, the indicator area 21 and type area 22 are provided at least in information layer L1. The indicator area 21 and type area 22 may be provided not just on information layer L1 but also on the information layer corresponding to area T4.

Alternatively, areas T4 and U4 may be left empty, with no particular information stored, reserved for use in case a new standard is developed in the future. The indicator area 21 and type area 22 then hold information for two types of information layers, these being information layers L2 and L3.

Alternatively, the two bits assigned to area U2 may classify the corresponding DVD layer according to its type of information track structure. The classification may be based on the periodic structure of the information tracks, e.g., on their wobble frequency. For example, when the layer is a reproduction-only type layer such as a DVD-ROM layer having only pre-pits with no wobble, the bit value may be '00'. For DVD−R and DVD−RW, which have wobble, the bit value may be '01'. For DVD+R and DVD+RW, which have wobble with higher wobble frequency than DVD−R and DVD−RW, the bit value may be '10'. For DVD−RAM in which the head is shifted in the radius direction on a land/groove single spiral structure with no wobble, the bit value may be '11'. The frequency structure of the information tracks in a DVD layer has the same format for each category, so the characteristics of the wobble signal detection circuit (a circuit such as a band-pass filter for detecting the frequency of the periodic structure) can be set prior to access to the DVD layer, the disc rotation can be rapidly brought to the target value, and the access time can therefore be shortened.

In this embodiment, in a multilayer optical disc having information layers conforming to a plurality of different optical disc standards, information indicating the presence of other information layers is recorded, so the optical disc device can easily identify the presence or absence of other information layers, and access time can be shortened.

Furthermore, in the management region of the optical disc, a type area 22 which stores information indicating the types of information layers is provided in addition to the indicator area 21 which stores information indicating the presence or absence of other information layers, and the information in the indicator area 21 is related to the information in the type area 22 so that the information in the indicator area 21 and the information in the type area 22 have a hierarchical structure. Therefore, if another area is created in the user data area 15 in the future, or if another type of information layer is added, the hierarchical structure can be exploited to accommodate the expansion.

Furthermore, the information is recorded in the management area in an information layer having the highest recording density, which is expected to be the information layer most frequently accessed, ensuring that the optical disc device will read and retain the information.

When recording and reproducing information on an optical disc of this type, the optical disc device can set a suitable value for the laser power of a laser having a wavelength suitable for the layer to be accessed, based on information such as the above. The method of generating the tracking error signal indicating a relative positional discrepancy between the focused spot and the information written in the tracks in a direction crossing a plurality of tracks can be determined in advance, so the access time can be shortened.

Third Embodiment

In the third embodiment, the optical disc 1 has at most two types of information layers, including the type of the L1 layer. The third embodiment is similar to the second embodiment in regard to FIG. 1 to FIG. 5 and FIG. 7 to FIG. 10, but differs from the second embodiment in regard to the usage of the indicator area 21 and type area 22 in FIG. 12.

Figure 13:
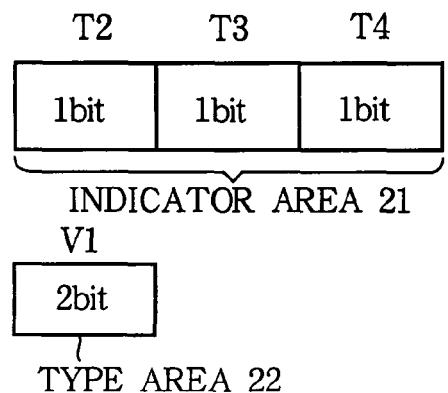
FIG. 13 is a schematic diagram showing parts of a management area in a third embodiment.

In FIG. 13, the areas T2, T3, T4 in the indicator area 21 are the same as in FIG. 12.

When an information layer other than information layer L1 is present, area V1 in the type area 22 indicates the type of this information layer. The type area 22 includes only the two bits of information in area V1. The values of these bits are '00' when the information layer is of the reproduction-only type, '01' when it is of the writable type, and '10' when it is of the rewritable type. The writable type includes DVD-R, DVD+R, and their dual-layer standards. The rewritable type includes dual-layer DVD-RW and DVD+RW and DVD-RAM.

For example when information layer L1 is a writable layer or pair of layers, information layers L2 and L3 are reproduction-only layers, and no other layers are present (T2=1, T3=1, T4=0), the bit values in area V1 will be '00'.

Thus, in the optical disc 1, when at least one of areas T2, T3, T4 in the indicator area 21 has a bit value of '1' and the corresponding information layers are of only one type, or when only one of areas T2, T3, T4 has a bit value of '1', the type area 22 can have only two bits, producing a saving of information bits as compared with the second embodiment above. In particular, there is an anticipated market demand for optical discs having only one of information layers L2 and L3 and using it as a reproduction-only layer, so if only optical discs having information layer L2 or L3 and using it as a reproduction-only layer are manufactured and sold, the two bits of area V1 will suffice for the type area 22.

Alternatively, as shown in the second embodiment, the classification in area V1 may be based on the type of information track structure, such as the presence or absence of wobble.

Although the area V1 of the type area 22 was shown as having two bits of information in this embodiment, it may have only one bit of information, saving one further information bit. In this case, the reproduction-only type may be indicated by '0' and other types, that is, the writable type and rewritable type, may be indicated by '1'. Alternatively, the classification may be based on the type of information track structure: for example, '0' when there is no wobble and '1' when wobble is present.

Furthermore, when the area V1 storing information indicating the type of information layer has only one bit and area T4 in the indicator area 21 in FIG. 13 is a reserved area with no particular information, the one bit of area V1 can be reassigned to area T4, since area T4 is a one-bit area to begin with. This scheme saves a still further information bit and, by placing the indicator area 21 and type area 22 adjacent to each other, can further shorten the access time of the disc device.

Other effects are similar to those shown in first and second embodiments.

Fourth Embodiment

It is possible to use the type area 22 of the second and third embodiments as a reserved area having a value of '00' or '0' with no information assigned, in expectation that effective use of this area can be made in the future. Also, as described in the third embodiment, if only optical discs having information layers L2 and L3 of the reproduction-only type are manufactured and sold, there is no particular need to assign information indicating the type of the information layer to the type area 22.

However, if the market changes in the future and not only optical discs having information layers L2 and L3 of the reproduction-only type but various other types of hybrid optical discs are manufactured and sold, it will be necessary to use the bit or bits in the type area 22 to indicate the type of information layer. In order to ensure compatibility with optical discs having information layers L2 and L3 of the reproduction-only type, the bit values '00' or '0' should be assigned to indicate the reproduction-only type, which is the type most frequently used. If these bits are used for indicating some completely different property, the value '00' or '0' should be protected in some way, such as being used only as a reserved value.

This embodiment provides only the information stored in the indicator area to indicate the presence or absence of other information layers, but since this information enables the optical disc device to identify the presence or absence of other information layers, it contributes to the shortening of the access time.

What is claimed is:

1. An optical data storage system comprising:
a laser light source for producing a laser beam;
a medium receptor for receiving an optical data storage medium containing at least one recording layer, wherein a management area storing information representing if another recording layer is resent in said medium is provided on said at least one recording layer;
a focusing device for focusing said laser beam on a recording layer of said medium; and
a photo detector for detecting a return laser beam from said medium and generating a data signal responsive thereto;
wherein said information stored in said management area represents if another recording layer is present in a predefined depth of said medium, and
wherein said focusing device focuses said laser beam onto said management area to read information stored therein.

2. An optical data storage system comprising:
a laser light source for producing a laser beam;
an optical data storage medium containing at least one recording layer, wherein a management area storing information representing if another recording layer is present in said medium is provided on said at least one recording layer;
a focusing device for focusing said laser beam on a recording layer of said medium; and
a photo detector for detecting a return laser beam from said medium and generating a data signal responsive thereto;
wherein said information stored in said management area represents if another recording layer is present in a predefined depth of said medium, and
said focusing device focuses said laser beam onto said management area to read information stored therein.

* * * * *